United States Patent
Rusanov et al.

(10) Patent No.: US 10,636,537 B2
(45) Date of Patent: Apr. 28, 2020

(54) SECONDARY STARTUP NEUTRON SOURCE

(71) Applicant: JOINT STOCK COMPANY "AKME-ENGINEERING", Moscow (RU)

(72) Inventors: Aleksandr Evgen'evich Rusanov, Obninsk Kaluzhskaya obl. (RU); Viktor Viktorovich Litvinov, Obninsk Kaluzhskaya obl. (RU); Vyacheslav Vasil'evich Popov, Obninsk Kaluzhskaya obl. (RU); Lyudmila Vasil'evna Skurikhina, Obninsk Kaluzhskaya obl. (RU); Aleksandr Dmitrievich Karpin, Obninsk Kaluzhskaya obl. (RU)

(73) Assignee: JOINT STOCK COMPANY "AKME-ENGINEERING", Moscow (RU)

( * ) Notice: Subject to any disclaimer, the term of this patent is extended or adjusted under 35 U.S.C. 154(b) by 74 days.

(21) Appl. No.: 15/537,460

(22) PCT Filed: Dec. 1, 2015

(86) PCT No.: PCT/RU2015/000839
§ 371 (c)(1),
(2) Date: Jun. 19, 2017

(87) PCT Pub. No.: WO2016/099333
PCT Pub. Date: Jun. 23, 2016

(65) Prior Publication Data
US 2017/0330642 A1   Nov. 16, 2017

(30) Foreign Application Priority Data

Dec. 19, 2014   (RU) .................... 2014151527

(51) Int. Cl.
G21G 4/02 (2006.01)
G21C 7/34 (2006.01)

(52) U.S. Cl.
CPC .............. *G21G 4/02* (2013.01); *G21C 7/34* (2013.01); *Y02E 30/38* (2013.01); *Y02E 30/39* (2013.01)

(58) Field of Classification Search
CPC .................................. G21G 4/02; G21C 7/34
See application file for complete search history.

(56) References Cited

U.S. PATENT DOCUMENTS 2,592,115 A * 4/1952 Carroll .................... G21G 4/02
164/68.1
2,868,990 A    1/1959 Reardon et al.
(Continued)

FOREIGN PATENT DOCUMENTS

RU   1762667 C    8/1994
RU   2308103 C2   10/2007

*Primary Examiner* — Sharon M Davis
(74) *Attorney, Agent, or Firm* — Shaukat A. Karjeker; Carstens & Cahoon, LLP

(57) ABSTRACT

The invention relates to nuclear engineering and more particularly to controlled reactor start-up. The invention addresses a secondary startup neutron source by creating additional safety barriers between the coolant and the source active part materials. The secondary startup neutron source is designed as a steel enclosure housing an ampule containing antimony in the central enclosure made of a niobium-based alloy unreactive with antimony, with a beryllium powder bed located between the antimony enclosure and the ampule enclosure. An upper gas collector, located above the ampule serves as a compensation volume collecting gaseous fission products. The ampule is supported by a reflector and a bottom gas collector. The gas collectors, reflector, ampule enclosure and washers are made of martensite-ferrite grade steel.

16 Claims, 3 Drawing Sheets

(56) References Cited

U.S. PATENT DOCUMENTS

| | | | | |
|---|---|---|---|---|
| 3,669,833 A | * | 6/1972 | De Boeck | G21C 3/18 |
| | | | | 376/412 |
| 4,208,247 A | * | 6/1980 | Impink, Jr. | G21C 7/117 |
| | | | | 376/156 |
| 5,255,298 A | * | 10/1993 | Johansson | G21C 3/18 |
| | | | | 376/412 |
| 2010/0054389 A1 | * | 3/2010 | Fetterman | G21C 3/326 |
| | | | | 376/417 |
| 2012/0087454 A1 | * | 4/2012 | Stucker | G21C 3/326 |
| | | | | 376/191 |
| 2012/0195402 A1 | | 8/2012 | Chahande et al. | |
| 2015/0194229 A1 | * | 7/2015 | Holden | G21C 1/30 |
| | | | | 376/190 |

\* cited by examiner

SECONDARY STARTUP NEUTRON SOURCE

CROSS-REFERENCE TO RELATED APPLICATIONS

This application is a US 371 Application from PCT/RU2015/000839 filed Dec. 1, 2015, which claims priority to Russia Application 2014151527 filed Dec. 19, 2014, the technical disclosures of which are hereby incorporated herein by reference.

FIELD OF THE INVENTION

The invention relates to nuclear engineering and is designed for controlled reactor start-up by rising the reactor to the working power level after normal and abnormal shutdowns.

BACKGROUND OF THE INVENTION

In order to improve the reactor safety and its dynamic properties, as well as to reduce consequences of start-up reactivity accidents, it is feasible to implement engineering measures to prevent "blind" start-up, because in subcritical reactor the neutron flux is the only and the most important variable parameter at reactivity rise. The controlled start-up means the possibility to measure the neutron flux in the reactor core depending on the position of standard control equipment compensating rods.

The amount of neutrons generated in the core as a result of spontaneous uranium fission ($\sim 2 \cdot 10^3$ n/s), is not sufficient to provide a controlled neutron flux in measuring chambers during the start.

The reactor subcriticalilty and power control is one of the most important nuclear safety tasks. In order to provide controlled reactor start-up, it is essential to ensure that the core neutron power is consistent with the response of ionization chambers monitoring the neutron flux which are located in a specific area near the core.

In order to ensure the control, the neutron flux in a subcritical reactor shall be increased significantly, or the start-up equipment response shall be increased accordingly. The most appropriate solution of the reliable power control problem of reactors (in the initial subcritical state) equipped with pulse start-up equipment is the allocation of neutron sources in the core.

Neutron sources designed as cluster assemblies are currently in use. The assembly includes two types of rods: rods with antimony filling, and rods with a hot-pressed beryllium bed.

Such designs are very large and occupy a considerable area in the core.

Neutron sources based on antimony-beryllium composition pellets enclosed in a single housing are currently in use. At present, such neutron source design is used at naval nuclear facilities.

The shortage of this design is potential antimony melting during the source manufacture and operation, resulting in the stratification of the antimony-beryllium composition and source efficiency degradation.

A monoenergetic neutron source is currently in use, disclosed in Patent RU No. 1762676, MPK G21G4/00 of Aug. 30, 1994. This neutron source is designed as radioactive antimony in a beryllium enclosure which is placed in the iron layer, with varying thickness of the beryllium and ferrum layers, which thickness is determined by the calculated ratios.

The device contains a photon source, cylinder-shaped antimony, a photoneutron source, beryllium shaped as a cylindric tube, a neutron filter, barrel-shaped ferrum, in which an antimony-beryllium system is placed, and then capped with an iron plug.

The shortage of this design is also potential antimony melting during the source manufacture and operation, resulting in the stratification of the antimony-beryllium composition and source efficiency degradation.

INVENTION DISCLOSURE

The invention solves the task of improving the reliability of the operational neutron source.

The technical result of the invention is the provision of additional safety barriers between the coolant and neutron source active part materials, the improvement of fail-free operation of the neutron source, its reliability and durability.

The above technical results are achieved by the following distinctive features of the invention.

As a solution to the stated problem, we claim an operational neutron source designed as an enclosure of a durable material, such as steel, inside of which there is an ampule containing active elements: antimony and beryllium with separate antimony and beryllium cavities positioned coaxially. The antimony is housed in the central ampule enclosure made of a material which does not react with the antimony during filling and operation, for example, a niobium-based alloy. The central enclosure of the ampule is leak tight. A beryllium powder bed is located between the antimony enclosure and the ampule enclosure. The beryllium powder bed porosity is 45%, with particle size from 60 to 200 micron. The ampule enclosure is made of a material poorly reacting with beryllium, for example, martensite-ferrite grade steel.

An upper gas collector is located above the ampule, which serves as a compensation volume collecting gaseous fission products. The gas collector is pressed against the ampule through washers with a spring.

At the bottom, the ampule is supported by a reflector and a bottom gas collector. The gas collectors, the reflector and the washers are made of a durable material, such as martensite-ferrite grade steel.

The neutron source enclosure inner cavity is filled with helium to ensure heat transfer.

The neutron source enclosure is sealed with two shanks: upper and lower ones. It is sealed by argon arc welding.

The ampule is placed in the neutron source enclosure with a 0.1 mm clearance.

The ampule is positioned in a four-ribbed enclosure in order to provide an additional safety barrier.

The operational neutron source ensures controlled reactor start-up from the subcritical state with fully submerged CPS rods at any time during the entire service life of the core, except for its initial start-up.

EMBODIMENT OF THE INVENTION

Figure 1:
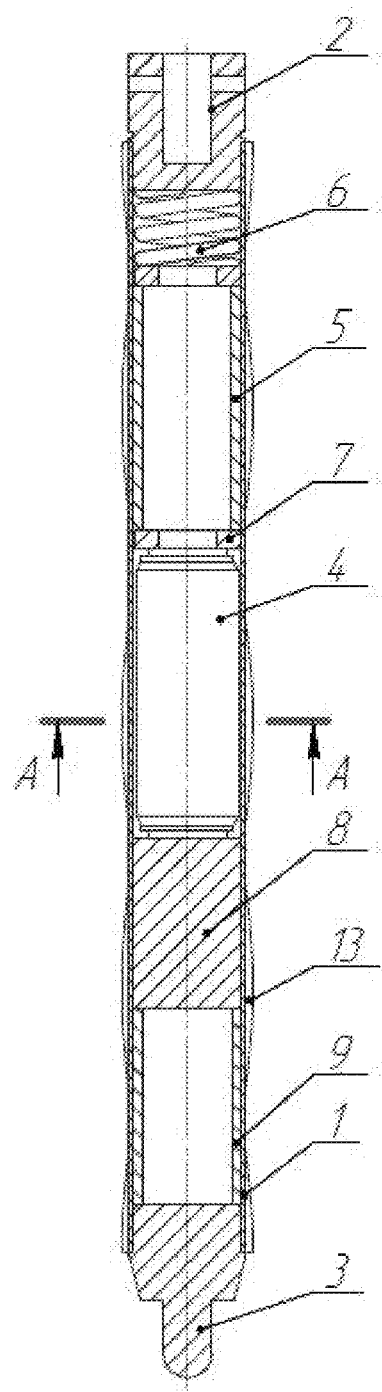
FIG. 1 shows the Secondary Startup Neutron Source in cross-section along a length thereof.
Figure 3:
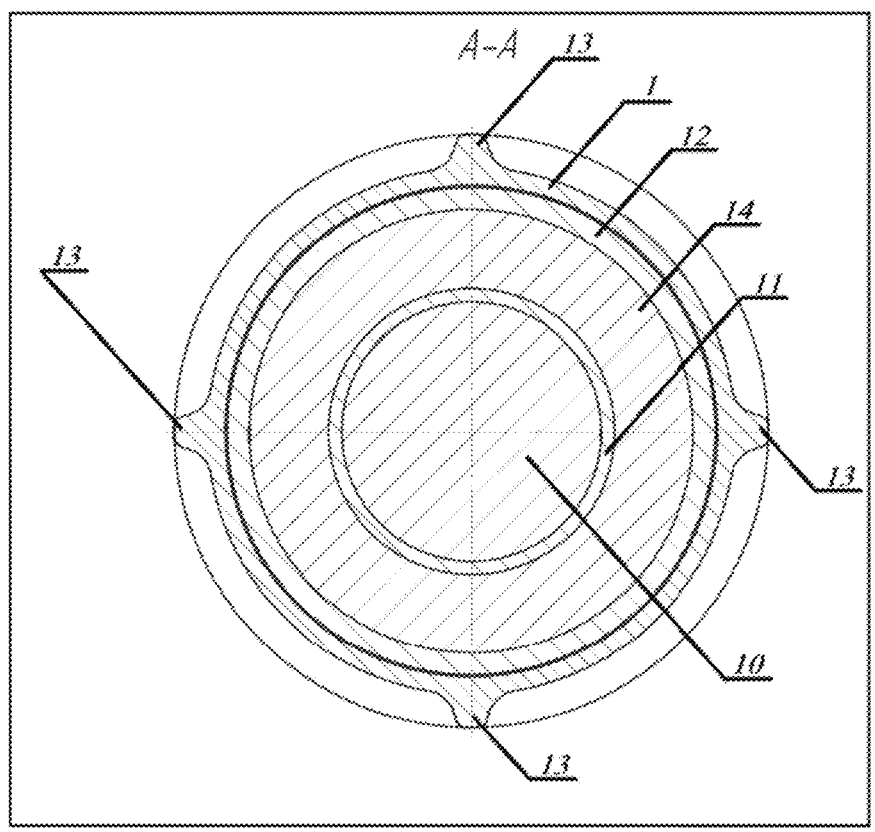
FIG. 3 shows a cross sectional view at A-A of FIG. 1.

The container-type Secondary Startup operational neutron source has an enclosure 1 made of ferritic martensitic grade steel with a diameter of 12 mm in the smooth part, and the wall thickness of 0.4 mm, with four spiral ribs 13 shown in FIGS. 1 and 3 located on the outer side of the enclosure. The diameter along the ribs 13 is 13.5 mm, the rib winding pitch is 750 mm.

The enclosure houses an ampule 4 with active elements: antimony and beryllium. The active components are located in separate antimony and beryllium cavities of coaxial design.

An upper gas collector is located above the ampule 5, which serves as a compensation volume collecting gaseous fission products. The gas collector 5 is pressed against the ampule through washers 7 with a spring 6.

At the bottom, the ampule is supported by a reflector 8 and a bottom gas collector 9.

The neutron source enclosure inner cavity is filled with helium to ensure heat transfer.

The neutron source enclosure is sealed with two shanks: upper shank 2 and lower shank 3.

It is sealed by argon arc welding.

The source enclosure, gas collectors, reflector and washers are made of martensite-ferrite grade steel.

Figure 2:
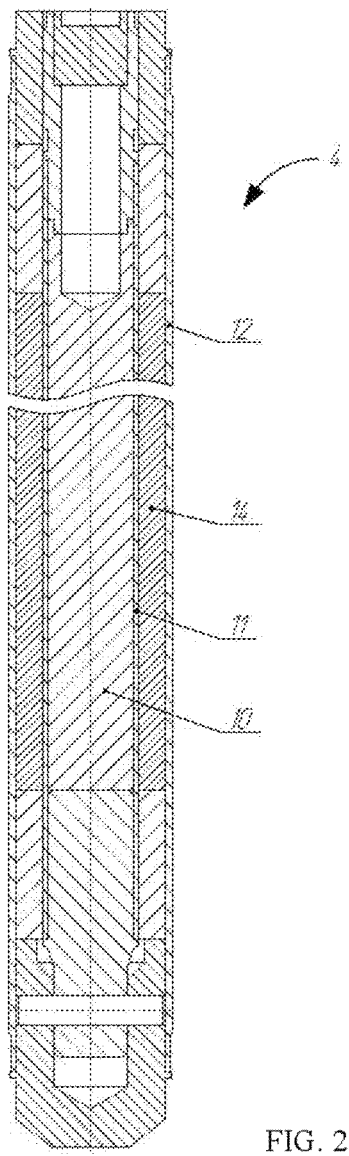
FIG. 2 shows a cross-section of the ampule of the Secondary Startup Neutron Source.

FIG. 2 shows the ampule of a coaxial design with the antimony 10 in the ampule central enclosure 11. The ampule central enclosure 11 is made of a niobium-based alloy which does not react with antimony during filling and operation. A beryllium bed 14 (shown in FIG. 3) is located between the ampule central enclosure 11 and the ampule enclosure 12. Beryllium is a powder with particle size from 60 to 200 micron, and the beryllium powder bed porosity is 45%.

The ampule enclosure 12 is made of martensite-ferrite steel poorly reacting with beryllium.

The central ampule enclosure containing the antimony is leak tight. The ampule central enclosure and its elements may be made, for example, of the VN-2AE alloy.

The ampule 4 is placed in the enclosure 1 of martensite-ferrite grade steel with a 0.1 mm clearance. The length of the ampule active part is 190 mm, the overall length of the operational neutron source (active part) is 1,720 mm.

Due to provision of additional safety barriers between the coolant and the source active part materials, the operational neutron source of the claimed design, its active part, provides reliable operation of the reactor plant for a campaign of 53,000 effective hours (approximately 8 years).

The invention claimed is:

1. A secondary startup neutron source comprising an enclosure having an ampule therein, the ampule having a housing wherein the antimony and beryllium are contained in a coaxial arrangement with the antimony in a central enclosure located in a central portion of the ampule, and the beryllium is in powdered form located in an annular space between the housing and the central enclosure.

2. The secondary startup neutron source according to claim 1, wherein the housing of the ampule is made of an alloy, which does not interact with antimony during filling and operation.

3. The secondary startup neutron source according to claim 2, wherein the housing of the ampule is made of a niobium-based alloy.

4. The secondary startup neutron source according to claim 2, wherein the housing of the ampule is made of a material weakly interactive with beryllium.

5. The secondary startup neutron source according to claim 4, wherein the ampule enclosure is made of ferritic-martensitic steel.

6. The secondary startup neutron source according to claim 1, wherein the powdered beryllium has a particle size from 60 to 200 micron, and a porosity of 45%.

7. The secondary startup neutron source according to claim 1, wherein the ampule is installed in the enclosure of the secondary startup neutron source with a 0.1 mm clearance.

8. The secondary startup neutron source according to claim 1, wherein the enclosure further comprises an upper gas collector above the ampule.

9. The secondary startup neutron source according to claim 1, further comprising an upper gas collector, wherein the upper gas collector is pressed against the ampule through washers by a spring.

10. The secondary startup neutron source according to claim 1, wherein at the ampule is located above a reflector and a lower gas collector within the enclosure.

11. The secondary startup neutron source according to claim 1, wherein an inner cavity of the enclosure is filled with helium.

12. The secondary startup neutron source according to claim 1, wherein the enclosure is leak-proof.

13. The secondary startup neutron source according to claim 12, wherein the enclosure is sealed with an upper shank and a lower shank.

14. The secondary startup neutron source according to claim 12, wherein the enclosure is sealed by argon-arc welding.

15. The secondary startup neutron source according to claim 1, wherein the enclosure has four spaced apart spiral ribs.

16. The secondary startup neutron source according to claim 1, further comprising a gas collector, a reflector, washers and a spring, and wherein the enclosure, gas collector, spring, reflector and washers are made of ferritic-martensitic steel.

* * * * *